(12) United States Patent
Tamas et al.

(10) Patent No.: US 7,774,358 B2
(45) Date of Patent: Aug. 10, 2010

(54) MULTIMEDIA DATA PUBLISHING SYSTEM

(75) Inventors: Alexis Tamas, Paris (FR); Amaury Grimbert, Paris (FR)

(73) Assignee: STG Interactive, Paris (FR)

( * ) Notice: Subject to any disclaimer, the term of this patent is extended or adjusted under 35 U.S.C. 154(b) by 326 days.

(21) Appl. No.: 11/400,156

(22) Filed: Apr. 7, 2006

(65) Prior Publication Data

US 2006/0253493 A1    Nov. 9, 2006

Related U.S. Application Data

(63) Continuation-in-part of application No. 10/310,406, filed on Dec. 5, 2002, now abandoned, which is a continuation of application No. PCT/FR01/01783, filed on Jun. 8, 2001.

(30) Foreign Application Priority Data

Jun. 8, 2000     (FR) ................................. 00 07358

(51) Int. Cl.
    *G06F 7/00* (2006.01)
(52) U.S. Cl. ................. 707/770; 707/821; 707/912; 715/204; 715/207; 715/234; 715/236
(58) Field of Classification Search .................. None
    See application file for complete search history.

(56) References Cited

U.S. PATENT DOCUMENTS

| | | | | |
|---|---|---|---|---|
| 5,774,601 | A * | 6/1998 | Mahmoodi | ................. 382/298 |
| 5,845,299 | A * | 12/1998 | Arora et al. | ................. 715/209 |
| 5,860,073 | A |  1/1999 | Ferrel et al. | |
| 5,953,005 | A |  9/1999 | Liu | |
| 6,061,715 | A * | 5/2000 | Hawes | ...................... 709/203 |
| 6,081,840 | A |  6/2000 | Zhao | |
| 6,121,963 | A |  9/2000 | Ange | |
| 6,199,082 | B1 |  3/2001 | Ferrel et al. | |
| 6,484,156 | B1 | 11/2002 | Gupta et al. | |

(Continued)

FOREIGN PATENT DOCUMENTS

EP    0 820 026 A1    1/1998

(Continued)

OTHER PUBLICATIONS

Fielding et al., Hypertext Transfer Protocol—HTTP/1.1, The Internet Society, Copyright 1999, pp. 1-55.*

(Continued)

*Primary Examiner*—Hung Q Pham
(74) *Attorney, Agent, or Firm*—Harness, Dickey & Pierce, P.L.C.

(57) ABSTRACT

A multimedia data publishing system including a server connected to a computer network and a plurality of host terminals connected to the computer network, where the server includes a database in which digital files are saved containing descriptors of multimedia pages, and a program for management of the database and of the exchanges with the host terminals, the host terminals being equipped with a random access memory for temporarily saving digital files downloaded from the database of the server, and navigation software for the visual representation of the pages relating to the descriptors of a downloaded file, wherein at least some digital files include descriptors of at least two visual representations of a given digital file.

24 Claims, 1 Drawing Sheet

U.S. PATENT DOCUMENTS

| | | |
|---|---|---|
| 6,584,480 B1 | 6/2003 | Ferrel et al. |
| 6,665,835 B1 | 12/2003 | Gutfreund et al. |
| 6,820,111 B1 | 11/2004 | Rubin et al. |
| 6,917,965 B2 | 7/2005 | Gupta et al. |
| 2002/0194195 A1 | 12/2002 | Fenton et al. |

FOREIGN PATENT DOCUMENTS

| | | |
|---|---|---|
| WO | WO 98/54637 | 12/1998 |

OTHER PUBLICATIONS

Andrew Cunningham, Multilingual Unicode Web Page Development, Community Networking Conference, Oct. 1, 1999, pp. 1-15.*

Dick Oliver, "Sams Teach Yourself HTML 4 in 24 Hours, Fourth Edition", Sep. 1999, Sams, 64 Pages.*

Bott et al., "Special Edition Using Windows 95 with Internet Explorer 4.0", Feb. 1998, Que, 33 Pages.*

Microsoft Corporation, "Internet Explorer 4.0 Accessibility", Microsoft, copyright 1997, <http://download.microsoft.com/download/6/c/1/6c14eea2-2e76-40dc-8bfb-cfe86bdc9862/MSIE40AC.DOC>.*

Fabio Vitali et al., *Extending HTML in a principled way with displets*, Computer Networks and ISDN Systems, Elsevier Science B.V., vol. 29, No. 8-13, pp. 1115-1128, Sep. 1, 1997.

\* cited by examiner

MULTIMEDIA DATA PUBLISHING SYSTEM

RELATED APPLICATION

This is a continuation-in-part of U.S. Ser. No. 10/310,406, filed Dec. 5, 2002, which is a continuation of International Application No. PCT/FR2001/01783, with an international filing date of Jun. 8, 2001 (WO 01/95147 A1, published Dec. 13, 2001), which is based on French Patent Application No. 00/07358, filed Jun. 8, 2000.

TECHNICAL FIELD

This invention concerns an electronic multimedia data publishing system.

BACKGROUND

HTML format and formats derived from it are known. They are used to edit multimedia pages on intranet networks or the Internet. The HTML format produces the description of pages by means of descriptors that are recognized by a dedicated consultation software, and which reconstitute the graphical representation in accordance with the layout determined by the page designer.

U.S. Pat. No. 6,199,082 discloses a multimedia publishing system for the production of content and management of page layout. This publishing system is based on an architecture comprising an editing station which uploads objects onto a server so that the latter can be stored and then distributed, to be consulted by an end user through a query issued by a browser. The content and page layout of each object are separate. When a client accesses the objects on the server using a browser, the client downloads the content and page layout. This first download is used to cache the page layout so as to only retrieve the content during the subsequent downloads. The page interpreted by the browser is generated from a file that includes the content to be displayed, accompanied by style sheets chosen from amongst N sheets created by the site editor.

This multimedia publishing system constitutes a Web site content-generation tool. In this tool basic processing for each of the objects only occurs once the content and the page layout is processed, i.e., during the creation of the objects by the editor, upstream of its diffusion. Furthermore, the interpretation by the browser of a single uploaded file does not allow the offering of different visual representations of a page, either in terms of the shape of content for example, or indeed of the page layout.

Also known are Web sites, but the latter have several disadvantages.

First, they use consultation software installed on the host terminals, commonly known by the name of "browsers", which operate with relatively complex menus requiring special difficult settings, using a plurality of separate windows superimposed on each other, and ending up finally with a relatively significant blanking of the main information coming from the site by secondary technical information coming from the consultation tool. The principal message is therefore less effective because of the design of these browsers. Furthermore, it involves an application which is not designed to coexist continuously with other applications that are running. It is generally not possible to work simultaneously on several active applications when one is a browser.

The format of the Web sites also give rise to other disadvantages because of the lack of homogeneity of the representations from one software environment to another. The representation varies according to the browser and operating system used, sometimes leading to malfunctions and graphical anomalies. In addition, they result in significant wait times, and the sites adhering to the Web format are incompatible with protocols such as WAP or interactive television, except to use translation gateways.

Finally, the search for a site is difficult because of the enormous number of search engines and indexing systems, with no guarantee of exhaustiveness, and operating independently in relation to the registration of the sites, which remains optional and outside the control of the site distributor.

It would therefore be helpful to allow an end user to view multimedia content coming from a server, and navigate within that content in a manner that is configurable by parameters chosen by the user. It would also be helpful to reduce the development cost of the applications and reduce the total file size of the pages transmitted.

SUMMARY

This invention relates to a multimedia data publishing system including a server connected to a computer network and a plurality of host terminals connected to the computer network, where the server includes a database in which digital files are saved containing descriptors of multimedia pages, and a program for management of the database and of the exchanges with the host terminals, the host terminals being equipped with a random access memory for temporarily saving digital files downloaded from the database of the server, and navigation software for the visual representation of the pages relating to the descriptors of a downloaded file, wherein at least some digital files include descriptors of at least two visual representations of a given digital file.

This invention also relates to a multimedia data publication process including saving digital files on a server, transmitting the digital files to a host terminal, in accordance with queries emitted by navigation software on the host terminal, and displaying a page corresponding to the digital file, wherein the digital files are saved on the server in the form of a single file for each page displayed, and wherein each of the files includes a definition of resources intended to be represented during the display on the host terminal, the resources being defined independently of their dimension, positioning, orientation, and processing and graphical effects, a definition of the shape of a page display window on the host terminal by a combination of graphical shapes, the graphical shapes each being constructed from one or more resources, a description of a graphical organization of content of the page by superimposition of graphical contents, where each of the graphical contents are constructed from one or more resources, interactive buttons, and elements relating to reloading of the page displayed, and loading a new page and the elements used to control relations between the host terminal and the server on which the digital file is saved, the display of the page being carried out by the navigation software installed on the host terminal according to the content of the single digital file transmitted by the server, and to specific settings chosen by a user allowing the display with a plurality of visual representations for each of the pages.

This invention further relates to a multimedia data publishing system including a server connected to a computer network, a plurality of host terminals connected to the computer network, the host terminals being equipped with a random access memory for temporarily saving a digital file and associated resources downloaded from the server, and navigation software for visual representation of pages, wherein each of the pages corresponds to a single digital file that includes a definition of the resources intended to be represented during the display on the host terminal, the resources being defined independently of their dimension, positioning, orientation and processing and graphical effects, a definition of the shape of a page display window on the host terminal by a combination of graphical shapes, where the graphical shapes are each constructed from one or more resources, a description of a graphical organization of the content of the page by superimposition of graphical contents, where each of the graphical contents is constructed from one or more resources, interactive buttons, and elements relating to reloading the page displayed, and loading a new page and the elements used to control relations between the host terminal and the server on which the digital file is saved, the display of the page being carried out by the navigation software installed on the host terminal according to the content of the single digital file transmitted by the server, and to specific settings chosen by a user allowing the display with a plurality of visual representations for each of the pages.

BRIEF DESCRIPTION OF THE DRAWING

Selected aspects of this invention will be understood more clearly by reading the description of a non-limiting representative example, referring to the appended drawing in which.

DETAILED DESCRIPTION

Figure 1:
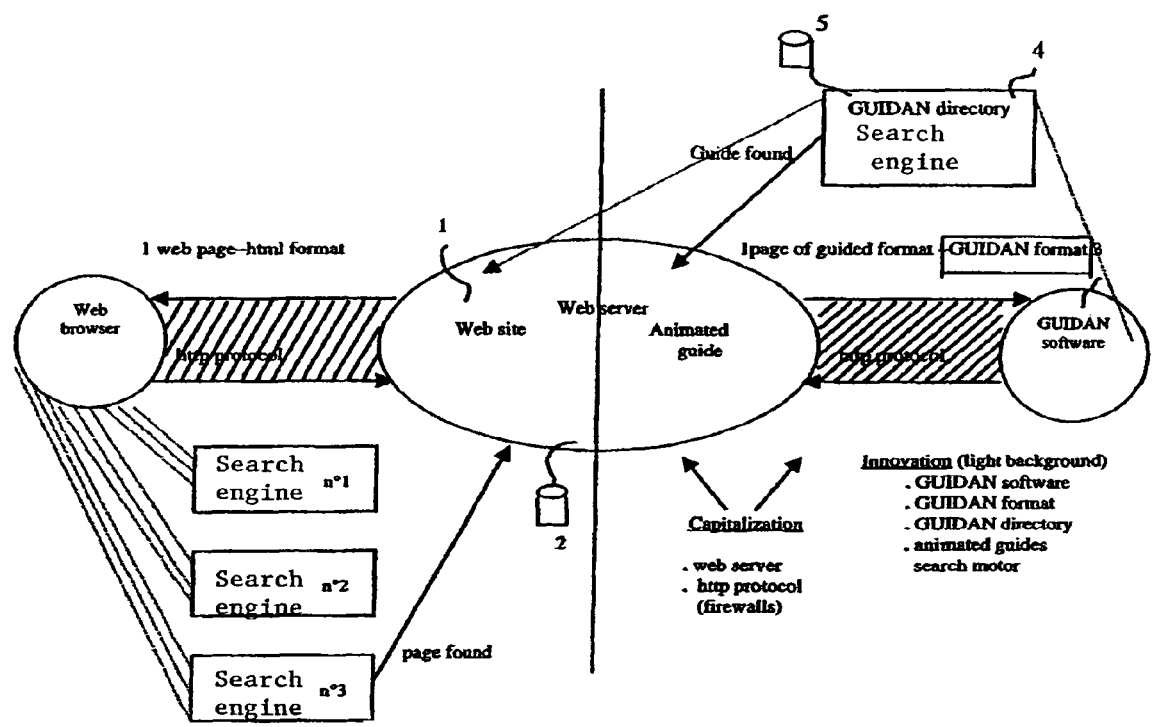
FIG. 1 is a schematic view of a multimedia data publishing system.

To this effect, selected aspects of this invention concern, according to a general sense, an electronic multimedia data publishing system comprising a server connected to a computer network and a plurality of host terminals connected to the computer network, the server comprising a database in which digital files are filed, i.e., digital files containing descriptors of multimedia pages, and a program for management of the database and the exchanges with the host terminals, with the host terminals being equipped with random access memory for temporarily saving digital files (or digital data) downloaded from the database of the server, and a consultation software (or navigation software) for visual representation of the files according to the descriptors of a downloaded page, characterized in that some digital files (or digital data) at least include descriptors of at least two visual representations of a given digital file, and preferably three distinct visual representations.

In particular, a digital file (or digital data) comprises electronic documents conforming to a pre-defined format and language, for creation of the multimedia functions by the navigation software.

One of the visual representation may correspond to a representation producing a display of the page with greater dimensions than those of a second representation included in the same digital file.

The digital file corresponding to a page also may include means for switching between the different visual representations included in the same file.

Preferably, the switching means comprises detection of an action on a key of the pointing device when the latter designates an inactive zone of the representation generated by the digital file.

The digital file may contain descriptors of the geometrical shape of the display area of the representation.

The files may contain descriptors for loading and automatic representation of at least one other page. Preferably, the files contain descriptors for the loading and representation of a plurality of interactive layers represented in a common display area.

Another aspect concerns a multimedia data publishing system comprising a server connected to a computer network and a plurality of host terminals connected to the computer network, the host terminals being equipped with a random access memory for temporarily saving a digital file and the associated resources downloaded from the server, and a navigation software for the visual representation of the pages, characterized in that each of the pages corresponds to a single digital file that includes:

a definition of the resources (image, text, etc.) intended to be represented when displayed on the host terminal, the resources being defined independently of their dimensions, positioning, orientation as well as the processing and graphical effects;

a definition of the shape of the page display window on the host terminal by the combination of graphical shapes, where the graphical shapes are each constructed from one or more resources;

a description of the graphical organization of the content of the page by the superimposition of graphical contents, where the graphical contents are each constructed from one or more resources;

interactive buttons (for navigation to another page, viewing an image, downloading a file, opening a form, opening another application on the host terminal, etc.) by the association of superimposed graphical content;

elements relating to reloading the page displayed, and to loading a new page and the elements used to control the relations between the host terminal and the server on which the digital file is saved, the display of the page being carried out by the navigation software installed on the host terminal according to the content of the single digital file transmitted by the server, and to specific settings chosen by the user allowing the display with a plurality of visual representations for each of the pages.

Another aspect relates to a multimedia data publication process comprised of saving digital files on a server and transmitting the digital files to a host terminal in accordance with queries emitted by a navigation software installed on the host terminal, and displaying a page corresponding to the digital file, characterized in that the digital files are saved on the server in the form of a single file for each page displayed, where each of the files includes:

a definition of the resources (image, text, etc.) intended to be represented during the display on the host terminal, the resources being defined independently of their dimension, positioning, orientation, as well as the processing and graphical effects;

a definition of the shape of the page display window on the host terminal, by the combination of graphical shapes, the graphical shapes each being constructed from one or more resources;

a description of the graphical organization of the content of the page by superimposition of graphical contents, where each of the graphical contents are constructed from one or more resources;

interactive buttons (for navigation to another page, viewing an image, downloading a file, opening a form, opening another application on the host terminal, etc.) by the association of superimposed graphical content;

elements relating to reloading the page displayed, and to loading a new page and the elements used to control the relations between the host terminal and the server on which the digital file is saved, the display of the page being carried out by the navigation software installed on the host terminal according to the content of the single digital file transmitted by the server, and to specific settings chosen by the user allowing the display with a plurality of visual representations for each of the pages.

The pages may be grouped into sets of pages comprising a home page accessible by a single address through the navigation software installed on the host terminal, the other pages of a set being accessible only through information contained in the home page or in another page of the set.

The pages may be grouped into sets of pages, the shape of the display window of at least one page of a set of pages differing from the shape of the display window of the other pages of the set of pages. This allows a change of state of the content, or an event, during loading of a new page to be indicated by modifying the form of the page display window.

The navigation software may be installed on the host terminal and includes a complete Unicode character font that is independent of the character fonts held on the host terminal.

The stage of display of the page by the navigation software installed on the host terminal may include the representation or omission of certain graphical contents of the page and inclusion or omission of certain graphical shapes of the page, depending on the interpreted data of the digital file and the specific settings chosen by the user.

Certain graphical contents constituting an interactive button on the page may have conditions of representation or omission according to the interpreted data of the digital file and the position indicated by the pointing device in relation to the zone of the interactive button on the page.

The digital file may include an identifier that the navigation software sends on to the server in the query to display a new page, allowing one to create, maintain or progress a session.

The navigation software may allow the identifier to be preserved in memory on closure of the page display window.

The digital file may include the description of an image resource saved on the server containing the digital file, the image resource being saved in a specific format (JPEG, PNG, GIF or the like) and transmitted by the server to the host terminal in accordance with a query emitted by the navigation software.

The digital file may include instructions controlling loading into cache memory or deletion from cache memory of the image resource on the host terminal. The digital file may also include instructions controlling transmission of information by the navigation software to an external server.

The navigation software may control the simultaneous display of several distinct sets of pages in different display windows. The navigation software may also control the display of the page display window on top of the windows of the other applications open on the host terminal.

The component elements of the page may be described, during construction of the digital file, by:
  pixels and a geometrical appearance for the images, graphical shapes defined by parameters (nature of the shape, characteristics and the like) and sequences of Unicode characters for the text,
  a relative dimension and position of each of the elements in relation to a page display window,
  instructions concerning the processing and the effects to be performed on the resources, the graphical shapes and the graphical contents, when displaying the page,
  conditions for the representation, inclusion or omission of the elements,
  the elements being fully described in the digital file, where the digital file contains all of the layout and formatting rules, without resorting to additional files.

Advantageously, the stage of display of the page by the navigation software installed on the host terminal consists of constructing a display of the content of the page and the shape of the page display window, by calculating the position, the dimension and the orientation of the graphical contents and the graphical shapes, their superimposition and their combination, in relation to the dimension of the page display window, and by application of the processing and the effects corresponding to the instructions, where these calculations, processing and effects are refreshed during re-dimensioning of the page display window.

The process may include stages for pre-calculation of the data for the reference dimensions, and for re-sampling, by interpolation, for the intermediate display dimensions.

The elements may be recalculated conditionally in accordance with events on the host terminal, such as passage of the cursor of the pointing device to modify the appearance of one or more elements described in the page, in an interactive manner.

Turning now to FIG. 1, selected aspects of the system include content servers (1) connected, in the example described, to the Internet network for the exchange of data in the http format, and conforming to the TCP/IP protocols.

The content server includes a memory (2) in which the electronic documents (digital files) that make up a content server are saved. The host terminals (3) are equipped with a specific consultation software (or navigation software) capable of using the files of the content server.

To allow access by Internet surfers to a content server, and to make it visible on the network, one begins by first registering the content server in a database (5) on a single directory server (4) in the form of a single address. The navigation software equipping the host terminal (3) displays a command window allowing a command window to be activated. This window is used to search for content and for accessing specific files.

The command window is used to search for a content server using textual search criteria, and identification of the address of the server (1) on which the digital constituents of the sought content server are saved.

These constituents are then loaded into the random access memory of the host terminal (3). The constituents are recognized by the specific navigation software, and then perform most of the functions, without requiring the use of menus associated with the navigation software.

The description that follows concerns one example of formatting the specific constituents.

The content files have a structure that includes:
  a window opening tag,
  a tag preceding a zone containing instructions for calling resources in memory,
  a tag preceding a zone containing instructions for processing the resources,
  one or more tags preceding a zone containing descriptions of the visual objects, meaning a description of the resources. In the case of a plurality of tags, each tag refers to the description of the objects corresponding to one of the visual representations of the same content file. In the case of a single tag, the descriptions of the objects include conditional appearance indicators, with the indicators corresponding to the visual representations, and
  a closure tag.

The description of the visual objects concerns the display of text, blocks of text, images, geometrical shapes, counts and the like. A file includes at least two, and preferably three, different descriptions for each of the visual representations of the given digital file. Certain visual representations include only descriptions of static objects, and other visual representations can include descriptors of dynamic objects such as links to other resources or files.

In one method, the system can be used to display and navigate in content through a unlimited number of pages. The component elements of a page are described during the interpretation of the digital file. These elements are characterized, for example, by images, graphical shapes defined by parameters such as the nature and characteristics of the shape concerned, and sequences of Unicode characters for the text. These component elements include relative dimension and position parameters for a page display window, but also instructions concerning the processing to be performed on a resource when it is displayed, and display or omission conditions. These elements are fully described in the digital file transmitted by the server to the navigation software installed on the host terminal, and contain all the layout and formatting rules without resorting to additional files. The navigation software controls the display of the page display window on top of the windows of the other applications open on the host terminal.

By way of a preferred example, the component elements of the page are described, during construction of the digital file, by:

pixels and a geometrical appearance for images, graphical shapes defined by parameters (nature of the shape, characteristics, etc.) and sequences of Unicode characters for the text, a relative dimension and position for each of the elements in relation to a page display window, instructions concerning the processing and the effects to be performed on the resources, graphical shapes and graphical contents, when displaying the page, conditions for representation, inclusion or omission of the elements, with the elements being fully described in the digital file, and the digital file containing all the layout and formatting rules without resorting to additional files.

The navigation software constructs a display when displaying the page on the host terminal by calculating the position, dimension and orientation of the resource in relation to the dimension of the page display window, and also by application of the treatment corresponding to the interpreted instructions. These calculations and processing are refreshed when re-dimensioning the page display window.

The page display window whose shape is described by a descriptor interpreted by the navigation software is preferably rectangular or elliptical, but can have other shapes. The shape of the page display window is reconfigurable by the end user by applying a local modification of the treatment applied to the shape descriptor of the window and its parameters. The system provides the ability to re-dimension the display window to reference dimensions obtained by pre-calculation, or to intermediate display dimensions through re-sampling by interpolation.

The essence of the processing performed on the graphical contents, the graphical shapes and the effects, is performed by navigation software when displaying the page. This therefore allows one not only to reduce the data transmitted and especially the development cost of the applications, and improve the quality of the rendering without complication at the moment of construction, but also to reduce the total size file of the pages transmitted.

Secondly, the navigation software offers the ability to display several distinct sets of pages. Selection of the size or the shape of these pages determines the calculation of the display of file content. Dimensioning and positioning of the specific shapes of a page is carried out by vectorial calculation if there is no shape defined for a page, or when the chosen shape is irreproducible, then the default shape will be a rounded rectangle.

In addition, the navigation software allows the display of an unlimited number of pages of a given set of pages. Each page is structured according to the representation and the page layout and not according to the content, as it could be in XML. A page includes a certain number of elements which provides it with a set of options.

Within the structure of each of these pages, resources are defined which will be used for all the elements of the page. These resources correspond to the images, text, graphics and pixels. They are defined independently of their positioning or indeed of their orientation. In an example, the display format options of a resource, such as text, by the navigation software, are as follows, with:

characters that can be displayed horizontally, in lines organized from top to bottom, which can be read from left to right;

characters that can be displayed horizontally, in lines organized from top to bottom, which can be read from right to left;

characters that can be displayed horizontally, in lines organized from bottom to top, which can be read from left to right;

characters that can be displayed horizontally, in lines organized from bottom to top, which can be read from right to left;

characters that can be displayed vertically, in columns organized from top to bottom, which can be read from left to right;

characters that can be displayed vertically, in columns organized from top to bottom, which can be read from right to left;

characters that can be displayed vertically, in columns organized from bottom to top, which can be read from left to right;

characters that can be displayed vertically, in columns organized from bottom to top, which can be read from right to left.

In a given page, the resources can undergo a pre-processing effected by the navigation software by changing color, or again by resource duplication for a treatment with a second effect. Different processes are used to apply filters to these resources before they are used in elements of graphical shape or graphical content. The application of filters thus allows one to modify certain parameters such as:

brightness, contrast, saturation of the colors, hue of the colors, solarization of the colors, addition or subtraction in a uniform manner of a certain color to or from the resource, mixing of a color with the resource in a uniform manner, a negative effect, uniform addition or subtraction of transparency to or from the resource, an effect that inverts the transparency of the resource, an effect that affords transparency to the surface of a resource whose brightness has a certain value, an effect which affords transparency to the surface of a resource whose color has a certain value, an effect which transfers the brightness of a resource to its alpha/transparency channel, an effect which transfers the alpha/transparency channel of the resource to its brightness.

In the context of processing applied to the graphical contents by the navigation software, relief, masking or shadow effects can be applied to them.

Concerning the masking, the latter is defined using an existing resource whose transparency is combined with the transparency of the content. In one representative method, up to eight different masks can be applied to content using masking elements successively within a given page. These masks are combined in the order in which the latter are specified in the digital file corresponding to the page. In the shadow case, this is applied to the content, and displayed alongside the content of the page. If the content contains transparent areas, the transparency of these areas will be applied to the shadows. In a given page, up to four different shadows can be added to the content using shadow elements successively. And in the case of the relief effect applied to the content of a page, up to four different types of relief can be applied to it using relief elements successively. In an example where the content is in rotation, the mask and the relief are applied before the rotation, while the shadow is applied after the rotation.

All these processing allow one of the resources to be positioned with a dimension and a stretch or repetition in a page.

The pages displayed by the navigation software can include buttons to facilitate navigation by the end user in a set of pages. These buttons thus enable the user to go to another page in the same set of pages, to another set of pages, or indeed to open a Web site in a Web browser, or again to open another software or another application on the host terminal. In this context, elements can be recalculated conditionally according to events, such as during the passage of a cursor over certain preset points on the surface of the page, and in particular on certain navigation buttons. This passage can modify the appearance of one or more elements described in the page in an interactive manner, and create a local event to anticipate the action of the user. For example, it is possible to cause the appearance of an entry form using a button with the mouse, or to cause a change in the shape of the cursor on passage of the mouse, which can show the icon of the target application.

Instructions in the digital file controlling the transmission of information by the navigation software to an external server allow a content editor who is publishing a set of pages to be in possession of statistical elements concerning navigation of an end user in the pages that have been visited. The content editor has the ability, through other instructions in the digital file, to control on the host terminal, the loading into cache memory or deletion from cache memory of the image resources.

The system can also be used to render a set of pages accessible directly only from an address associated with the home page of the set of pages, where the other pages of the same set cannot be accessed directly.

An identifier can be stored by the navigation software after the closure of a set of pages to preserve the current session. This saving of the session identifier allows a set of pages to be registered in the list of favorites. Transportation of this identifier from page to page allows one to create an application session in the digital file. This file thus contains all the elements necessary to create, maintain or progress through a session, without resorting to cookies, as well as for automatic redirection to another page, or the same page, or a set of pages.

The navigation software may contain a complete Unicode character font (Latin, Chinese, etc.) to render the display independent of the fonts available on the host terminal.

The navigation software contains windows that can thus be used to construct a digital file and view the display while in the process of construction of the corresponding page, with the digital file being saved on the server, or an external server, or again on the host terminal.

Although this invention has been described in connection with specific forms thereof, it will be appreciated that a wide variety of equivalents may be substituted for the specified elements described therein without departing from the spirit and scope of this invention as described in the appended claims.

The invention claimed is:

1. A multimedia data publication process comprising the steps of:

saving a plurality of digital files on a server, each digital file having content therein;

transmitting a file of the plurality of digital files to a host terminal, in response to a query emitted by navigation system software installed on the host terminal;

choosing, by a user on the host terminal, settings including position, size, and orientation of a display window on a screen of the host terminal;

computing a visual content on the host terminal by the navigation software according to the content in the transmitted file; and displaying the computed visual content only within the display window on the screen of the host terminal by navigation software, wherein a shape of the display window is determined by a shape of the computed visual content, wherein the content of the transmitted files comprises:

a definition of resources associated with the transmitted digital file, wherein the definition is used for computing the visual content represented during display of computed visual content on the host terminal, the resources being defined independently of their dimension, positioning, orientation, processing, and graphical effects;

a definition of the shape of the computed visual content by a combination of graphical shapes, the graphical shapes each being constructed from one or more of the resources;

a description of the layout of the computed visual content by superimposition of graphical elements, where each of the graphical elements is constructed from one or more of the resources and where the description includes layout properties to be interpreted by the navigation software for computing the visual content, depending on the settings chosen by the user of the host terminal, wherein the layout properties include the level of opacity of each graphical element in the computed visual content and the shape of the computed visual content;

interactive buttons; and elements for loading a new digital file of the plurality of digital files in response to user input, wherein the elements control a relation between the host terminal and the server on which the new digital file is saved.

2. The process according to claim 1, wherein the plurality of digital files are grouped into sets of digital files, wherein any one set of digital files may include a digital file corresponding to a home page that may be accessed via a single address through the navigation software, and where the other digital files of the set of digital files are accessible through information contained in the digital file corresponding to the home page or another digital file of the set of digital files.

3. The process according to claim 1, wherein the navigation software comprises a complete Unicode character font which is independent of character fonts held on the host terminal.

4. The process according to claim 1, wherein the step of computing the visual content by the navigation software includes a representation or omission of certain graphical elements of the transmitted file and an inclusion or omission of selected graphical shapes, depending on interpretation of the content in the transmitted file and settings chosen by the user of the host terminal.

5. The process according to claim 1, wherein the interactive buttons comprise conditions of representation or omission according to interpretation of the content in the transmitted file and a position on the display window indicated by a pointing device in relation to a zone of an interactive button in the computed visual content.

6. The process according to claim 1, wherein the transmitted file further comprises an identifier which the navigation software sends to the server in a subsequent query to load a new digital file, allowing the user of the host terminal to create, maintain or progress through a session.

7. The process according to claim 6, wherein the navigation software allows the identifier to be preserved in memory on closure of the display window.

8. The process according to claim 1, wherein the transmitted file further comprises a description of an image resource saved on the server saving the transmitted file, the image resource being saved in a specific format and transmitted by the server to the host terminal according to another query emitted by the navigation software.

9. The process according to claim 8, where the transmitted file further comprises instructions controlling loading into cache memory or deletion from the cache memory of the image resource on the host terminal.

10. The process according to claim 9, wherein the transmitted file further comprises instructions for controlling transmission of information by the navigation software to an external server.

11. The process according to claim 1, wherein the navigation software controls simultaneous display in different display windows of the visual content of several distinct sets of digital files.

12. The process according to claim 1, wherein the navigation software controls display of the display window on top of windows of other applications open on the host terminal.

13. The process according to claim 1, wherein graphical elements of the transmitted file further comprise:
pixels and a geometrical appearance for images, graphical shapes defined by parameters and sequences of Unicode characters for the text;
a relative dimension and position of each of the component elements in relation to the display window;
instructions concerning processing and effects to be performed on the resources, graphical shapes and graphical elements, when displaying the visual content; and
conditions for representation, inclusion of omission of the graphical elements, where the graphical elements are fully described in the transmitted file, and the transmitted file contains required layout and formatting rules without resorting to additional files.

14. The process according to claim 1, wherein computing the visual content by the navigation software comprises calculating position, dimension, orientation, superimposition, and combination of the graphical elements and the graphical shapes in relation to a dimension of the display window, and by applying processing and effects corresponding to the visual content, where the calculations, processing, and effects are refreshed during re-dimensioning of the window.

15. The process according to claim 14, wherein the position, dimension, orientation, superimposition, and combination can be recalculated conditionally according to events on the host terminal, by passage of a cursor of a pointing device to modify appearance of one or more elements described in the transmitted file, in an interactive manner.

16. A multimedia data publishing system comprising:
a server connected to a computer network, the server equipped with a device for saving a plurality of digital files;
a plurality of host terminals connected to the computer network, wherein a first host of the host terminals is equipped with a random access memory to temporarily save a first file of the digital files downloaded from the server; and
navigation software installed on the first host to:
receive user settings including position, size, and orientation of a display window on a screen,
compute a visual content on the host terminal according to the content of the first file, and
display the computed visual content only within the display window on the screen of the host terminal, wherein a shape of the display window is determined by a shape of the computed visual content,
wherein content of the first file comprises:
a definition of resources associated with the first file, wherein the definition is used for computing the visual content;
a definition of the shape of the computed visual content by a combination of graphical shapes, the graphical shapes are each being constructed from one or more of the resources;
a description of the layout of the computed visual content by superimposition of graphical elements, where each of the graphical elements is constructed from one or more of the resources and where the description includes layout properties to be interpreted by the navigation software for computing the visual content, depending on the user settings,
wherein the layout properties include the level of opacity of each graphical element in the computed visual content and the shape of the computed visual content;
interactive buttons; and
elements for downloading a new digital file, the elements used to control the relation between the host terminal and the server on which the digital files are saved.

17. The system according to claim 16, wherein at least one of the layout properties is interpreted according to the dimensions of the display window.

18. The system according to claim 16, wherein the first file also includes other resources for switching between different layouts of the computed visual content.

19. The system according to claim 18, wherein the other switching resources are composed of the detection of an action on a key of a pointing device, which designates an interactive zone of the computed visual content.

20. The system according to claim 16, wherein the first file contains descriptors of geometrical shape of an area of the computed visual content.

21. The system according to claim 16, wherein the first file contains descriptors for automatically downloading, computing and displaying at least one other digital file.

22. The system according to claim 16, wherein the first file contains descriptors for computing a plurality of interactive layers represented in a common area of the computed visual content.

23. The system according to claim 16, wherein the content of the first file has a structure that includes at least one of the following:
- an opening tag;
- a tag preceding a section containing instructions for downloading resources in memory;
- a tag preceding a section containing instructions for processing the resources;
- one or more tags preceding a section containing descriptions of the graphical elements; and
- a closure tag.

24. The system according to claim 23, wherein the first file includes a single description tag of associated graphical elements, and descriptions of elements include conditional appearance indicators, where the indicators permit the computation of the visual content with a plurality of representations for the digital first file.

* * * * *